Jan. 8, 1952 A. AUSTLID 2,581,620
SEWING MACHINE MOTOR
Filed Jan. 18, 1947

Patented Jan. 8, 1952

2,581,620

UNITED STATES PATENT OFFICE 2,581,620

SEWING MACHINE MOTOR

Arnljot Austlid, Oslo, Norway

Application January 18, 1947, Serial No. 722,817
In Norway January 22, 1946

1 Claim. (Cl. 112—220)

This invention relates to motor-driven sewing machines of the type where the motor is directly placed upon a shaft below the bed plate, and where the stator of the motor comprises a substantially horseshoe-formed magnet system have pole-shoes embracing the armature and a closed portion carrying the coils thread thereover.

An object of the invention is to provide an electric motor of very simple construction, which needs only a small space of accommodation.

Another object is to provide a motor, which may be mounted without difficulty.

Other features of the invention will appear from the following description.

Figure 1:
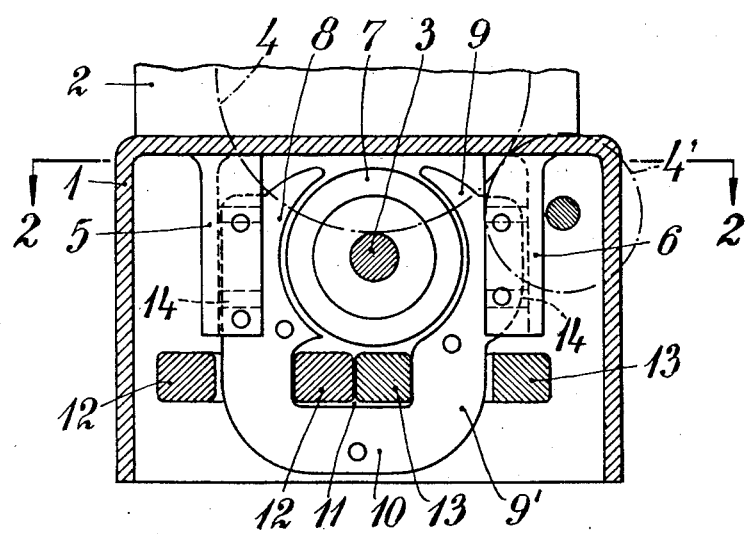
Figure 2:
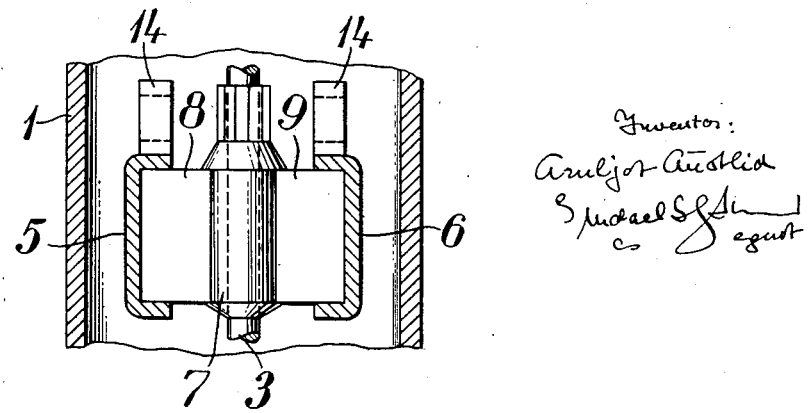

An embodiment of the invention is illustrated by way of example on the annexed, diagrammatical drawing, in which Fig. 1 shows a vertical section taken through the bed plate of the sewing machine. Fig. 2 is a section taken on line 2—2 in Fig. 1.

Numeral 1 designates a bed plate of channel form, and numeral 2 indicates the lower part of the machine arm. 3 is the catcher shaft extending longitudinally of the bed plate channel, and 4, 4' indicate gears transferring the rotation of the catcher shaft to the other parts of the driving mechanism.

The electrical motor comprises a rotor 7 keyed to the catcher shaft 3 and rotating within a two-poled magnet system, which is of substantially horseshoe-form and as usual is built up from lamellae. At the open end thereof the magnet system is provided with pole-shoes 8 and 9, each having a curved surface facing the rotor 7. These surfaces should have an area as large as possible for transmission of a greatest possible number of lines of magnetic flux through the rotor. The pole-shoes are interconnected through the closed end portion 10 of the magnet, where two magnet coils, 12 and 13 respectively, are so arranged that those parts of said coils which face one another are situated in the spaces 11 between the closed end portion 10 of the magnet and the rotor 7.

Ordinary pole-shoes are so shaped that they embrace such a large portion of the periphery of the rotor that the magnet coils cannot be threaded over either of the pole-shoes, due to the fact that the transitional portions between the pole-shoes and the closed portion of the magnet are too wide. Therefore, according to the invention, pole-shoe 9 is of such shape that the magnet coils may be threaded thereover and be brought into the positions indicated on the drawing. This is made possible by making the transitional part 9' between the pole-shoe 9 and the closed portion of the magnet somewhat thinner than the transitional portion of the other pole-shoe 8. However, in order that pole-shoe 9 still shall embrace a rotor periphery portion equal to that which the pole-shoe 8 embraces, and moreover that both pole-shoe surfaces shall be symmetrical, the closed portion of the magnet, and thus also the space 11 between this portion and the armature, must be non-symmetrically disposed in relation to a symmetry line through the axis of rotation of the rotor and the open end of the magnet. As will be seen the space 11 is displaced a little to the left (on the figure) of said symmetry line, whereby the surface of the pole-shoe 9 extends downwards to the same extent as the pole surface of pole-shoe 8.

The stator or magnet system of the motor is, in accordance with the invention, by means of bolts secured to ribs 5 and 6 respectively, which are cast integral or rigid with the material of the bed plate. Also the brush bridge means 14 of the motor is cast integral with the material of the bed plate.

Obviously the details of the arrangement may be modified within the scope of the invention.

I claim:

In a sewing machine having a cast machine bed plate and a catcher shaft rotatably mounted below the bed plate, the combination of a motor armature fixed directly on the catcher shaft; brush bridge means and stator supports cast integral with said bed plate; a substantially horseshoe shaped magnet, carrying pole-shoes largely embracing said motor armature and including also a closed transversal end portion, the transitional portion between one pole-shoe and the closed transversal end portion of the magnet being spaced a predetermined distance from plane of symmetry extending through the axis of rotation of the motor armature normal to said transversal closed end portion of the magnet and being shaped in such a manner as to allow threading over of field coils having a cross section of predetermined width, and the other transitional portion between the other pole-shoe and the closed transversal end portion of the magnet being spaced from said plane of symmetry a greater distance than said first mentioned transitional portion so as to allow sufficient space for the cross sectional width of said field coils between said transitional portions; and a projection on said other transitional portion forming an extension of said other pole-shoe and projecting along the surface of said motor armature between the same and the space provided for the field coils so as to render substantially equal the areas of said pole-shoes embracing said motor armature.

ARNLJOT AUSTLID.

REFERENCES CITED

The following references are of record in the file of this patent:

UNITED STATES PATENTS

| Number | Name | Date |
|---|---|---|
| 294,094 | Thomson | Feb. 26, 1884 |
| 403,487 | Perret | May 14, 1889 |
| 1,464,184 | Mansbendel | Aug. 7, 1923 |
| 1,848,804 | Schoonmaker | Mar. 8, 1932 |

FOREIGN PATENTS

| Number | Country | Date |
|---|---|---|
| 562,459 | Germany | Oct. 26, 1932 |